(12) United States Patent
Kim et al.

(10) Patent No.: US 11,646,124 B2
(45) Date of Patent: May 9, 2023

(54) PREVENTION DEVICE FOR LOCA AND NUCLEAR REACTOR HAVING THE SAME

(71) Applicants: KOREA ATOMIC ENERGY RESEARCH INSTITUTE, Daejeon (KR); KING ABDULLAH CITY FOR ATOMIC AND RENEWABLE ENERGY, Riyadh (SA)

(72) Inventors: Youngin Kim, Daejeon (KR); Seungyeob Ryu, Daejeon (KR); Youngmin Bae, Daejeon (KR); Joohyung Moon, Daejeon (KR); Hunsik Han, Sejong (KR); Soojai Shin, Sejong (KR); Cheongbong Chang, Daejeon (KR); Seok Kim, Daejeon (KR); Junewoo Kee, Pohang-si (KR); Hyunjun Cho, Daejeon (KR); Minkyu Lee, Daejeon (KR); Juhyeon Yoon, Daejeon (KR); Hyungi Yoon, Sejong (KR)

(73) Assignees: KOREA ATOMIC ENERGY RESEARCH INSTITUTE, Daejeon (KR); KING ABDULLAH CITY FOR ATOMIC AND RENEWABLE ENERGY, Riyadh (SA)

( * ) Notice: Subject to any disclaimer, the term of this patent is extended or adjusted under 35 U.S.C. 154(b) by 357 days.

(21) Appl. No.: 16/648,769

(22) PCT Filed: Aug. 23, 2018

(86) PCT No.: PCT/KR2018/009712
§ 371 (c)(1),
(2) Date: Mar. 19, 2020

(87) PCT Pub. No.: WO2019/059541
PCT Pub. Date: Mar. 28, 2019

(65) Prior Publication Data
US 2021/0375497 A1    Dec. 2, 2021

(30) Foreign Application Priority Data

Sep. 20, 2017  (KR) .................... 10-2017-0121277

(51) Int. Cl.
*G21C 13/032*    (2006.01)
*G21C 15/02*    (2006.01)
(Continued)

(52) U.S. Cl.
CPC ............ *G21C 15/02* (2013.01); *F16K 15/03* (2013.01); *G21C 15/18* (2013.01);
(Continued)

(58) Field of Classification Search
None
See application file for complete search history.

(56) References Cited

U.S. PATENT DOCUMENTS 9,466,695 B2 * 10/2016 Taraud ................. F16K 31/04
10,529,458 B2 * 1/2020 Kanuch ............... G21C 15/182
(Continued)

FOREIGN PATENT DOCUMENTS

JP   2014-048110 A   3/2014
KR   10-1234570 B1   2/2013
(Continued)

OTHER PUBLICATIONS

International Search Report dated Dec. 17, 2018 issued in PCT/KR2018/009712.

*Primary Examiner* — Lily C Garner
(74) *Attorney, Agent, or Firm* — Scully, Scott, Murphy & Presser, P.C.

(57) ABSTRACT

The present invention relates to a prevention device for loss of coolant accident (LOCA) and a nuclear reactor having the same. The prevention device for LOCA includes a nozzle portion integrally formed in a reactor vessel and having a
(Continued)

communication hole communicating with the inside of the reactor vessel, a nozzle finishing portion assembled to the nozzle portion and an injection line for injecting a fluid to the inside of the reactor vessel respectively on both sides thereof in a communicating manner, and a check valve mounting portion installed to be embedded inside the nozzle portion and having at least one check valve opened by flow such that the fluid is injected into the reactor vessel, wherein the check valve blocks outflow of a reactor coolant from the reactor vessel in case of failure of the injection line.

11 Claims, 12 Drawing Sheets

(51) Int. Cl.
*F16K 15/03* (2006.01)
*G21C 15/18* (2006.01)
*F16K 27/02* (2006.01)

(52) U.S. Cl.
CPC ...... *F16K 27/0209* (2013.01); *F16K 27/0227* (2013.01); *G21C 13/032* (2013.01)

(56) References Cited

U.S. PATENT DOCUMENTS

| | | | |
|---|---|---|---|
| 10,672,524 B2* | 6/2020 | Malloy, III | ........... G21C 15/243 |
| 2014/0241484 A1* | 8/2014 | Liao | ........................ G21C 9/004 |
| | | | 376/283 |
| 2016/0180974 A1* | 6/2016 | Malloy, III | ............ G21C 13/02 |
| | | | 376/210 |

FOREIGN PATENT DOCUMENTS

| KR | 20130020319 A | 2/2013 |
|---|---|---|
| KR | 10-1522223 B1 | 5/2015 |
| KR | 20150122762 A | 11/2015 |
| KR | 20170037971 A | 4/2017 |
| KR | 20170067752 | 6/2017 |

* cited by examiner

PREVENTION DEVICE FOR LOCA AND NUCLEAR REACTOR HAVING THE SAME

CROSS-REFERENCE TO RELATED APPLICATION

Pursuant to 35 U.S.C. § 119(a), this application claims the benefit of the earlier filing date and the right of priority to Korean Patent Application No. 10-2017-0121277, filed on Sep. 20, 2017, the contents of which is incorporated by reference herein in its entirety.

TECHNICAL FIELD

The present disclosure relates to a prevention device for a loss of coolant accident (LOCA) (or a loss of coolant accident) in an injection line such as a safety injection line of a nuclear power plant, and a nuclear reactor having the same.

BACKGROUND ART

Nuclear reactors may be divided into active reactors which use active power such as pumps and passive reactors which use passive power such as gravity or gas pressure depending on how a safety system is constructed.

Also, nuclear reactors are divided into a separate reactor (Korean pressurized water reactor) in which main devices (steam generator, pressurizer, pump impeller, etc.) are installed outside the reactor depending on the installation position of the main equipment and integral reactors (e.g., SMART reactor: Korea) in which the major equipment is installed inside a reactor vessel depending on an installation position of major equipment.

A reactor coolant system may include a reactor core, reactor coolant pumps, steam generators, and a pressurizer.

A steam generator (for a pressurized water reactor) receives heat produced by the core by fission through heat exchange with water of a reactor coolant circulated inside the reactor coolant system to produce steam.

In general, various types of pipe such as pipes for safety injection, shutdown cooling, water quality control of a coolant, etc., are connected to the reactor coolant system, and a loss of coolant accident may occur due to connection pipe breakage, or the like.

Unlike general industrial power plants, in a nuclear power plant, even when a nuclear reactor is shut down due to an accident, residual heat is generated from the core for a considerable period of time. Therefore, a safety injection system is installed to continuously replenish a reactor coolant to maintain core integrity in case of a loss of coolant accident.

In a conventional general active nuclear power plant (Korean commercial nuclear power plant), a plurality of safety injection tanks for replenishing a reactor coolant in case of a loss of coolant accident are operated by gas pressure, a plurality of safety injection pumps including an emergency AC power source are operated, and an in-containment refueling water storage tank (IRWST) is installed in a containment building to serve as a safety injection source.

Also, a conventional passive nuclear power plant (such as the US AP1000) may be configured such that a plurality of safety injection tanks are operated by gas pressure and a plurality of core makeup tanks and an in-containment refueling water storage tank are operated by gravity.

In the case of passive nuclear reactors (SMART of Korea) with integral reactors, a number of core makeup tanks and safety injection tanks are configured to operate by gravity. In case of a loss of coolant accident, various facilities are used for safety injection.

Korean Patent Registration No. 1234570 (Patent document 1) discloses an integral reactor capable of alleviating a loss of coolant accident by installing dual isolation valves integrated with a reactor reinforced nozzle to mitigate a loss of coolant accident and a mitigation method thereof.

In the case of Patent document 1, each of the dual isolation valves is installed in an outflow pipe and an inflow pipe, having an advantage that both the outflow and inflow pipes are separated.

However, since an operation signal for operating the isolation valves is required to recognize an accident and a valve driving unit for driving a valve disk is required, a size of a connection nozzle portion surrounding the isolation valve is increased, increasing difficulty in manufacturing a reactor vessel.

Korean Patent Registration No. 1522223 (Patent document 2) discloses an automatic break flow stoppage device and nuclear power plant having the same, in which check valves movable in both inflow and outflow directions are installed to alleviate a loss of coolant accident.

In the case of Patent document 2, since the check valves are installed in the outflow pipe and the inflow pipe, respectively, the check valves may be automatically operated by a pressure difference in case of an accident, for isolation.

However, when the check valves are separated for maintenance, a water level of the reactor coolant must be lowered, and since the size of the check valves increases due to the structure of the flow path for allowing bidirectional flow, the size of the nozzle portion surrounding the check valves increases, increasing the difficulty in manufacturing the reactor vessel.

Meanwhile, when considering installing a check valve on the connection nozzle of the nuclear reactor for reducing a loss of coolant accident, since a large-sized pipe having an inner diameter of dozens of inches is present in the loop type reactor, a very large connection nozzle is required to install the large check valve on the nozzle of the reactor vessel, and thus, it is very difficult to install the check valve.

Meanwhile, in the integral reactor, a main flow path is positioned inside the reactor vessel and a large-sized check valve is not present, and thus, a large check valve is not required. Thus, in the integral reactor, a small check valve having a few inches may be easily installed to be coupled to the connection nozzle of the reactor vessel.

However, when an injection line for injecting the reactor coolant is connected to the middle of the reactor vessel, in case of loss of coolant accident (LOCA) such as pipe breakage, the single-phase (liquid) reactor coolant quickly flows out to a height of the broken pipe in the reactor vessel and a water level is rapidly lowered. In view of this phenomenon, most of the pipes connected to the nuclear reactor are generally connected to an upper portion of the reactor vessel.

However, in the case of passive reactors, gravity water head is used for safety injection in many cases. Generally, as a height of a gravity structure increases, a load increases in seismic designing and a difficulty of seismic design is amplified.

For example, installing a large water tank such as an IRWST at a higher position above the reactor vessel greatly increases cost for seismic design due to the increase in height. Also, as an operating layer space on top of the reactor vessel is reduced, the containment building is increased to secure a similar space for maintenance, or the like, further increasing cost.

To reduce the cost for seismic design, in some nuclear power plants, a water tank is installed in a position slightly higher than the reactor vessel. In this case, in order to inject stored water of the IRWST to the inside of the reactor vessel, the injection line must be connected to the middle of the reactor vessel.

Therefore, the injection line needs to be connected to the reactor vessel without being restricted in position of the reactor vessel.

DISCLOSURE

Technical Problem

The present invention is directed to solving the above-mentioned problems and other problems.

A first object of the present invention is to provide a prevention device for loss of coolant accident (LOCA) capable of providing a flow path by opening a check valve when operating for the purpose of injection and blocking the flow path by closing the check valve when an injection line is damaged, thereby preventing outflow of a reactor coolant from a reactor coolant system, and a nuclear reactor having the same.

A second object of the present invention is to provide a prevention device for LOCA in which a nozzle portion and a nozzle finishing portion of a reactor vessel are designed to have an increased thickness so as not to be damaged by an impact within a design criterion, thus increasing safety without little probability of actual damage, and a nuclear reactor having the same.

A third object of the present invention is to provide a prevention device for LOCA which is not restricted in height of an injection line connected to a reactor vessel, and a nuclear reactor having the same.

A fourth object of the present invention is to provide a prevention device for LOCA capable of eliminating the necessity of adjusting a water level of a reactor container at the time of a maintenance operation and capable of drawing out a check valve for maintenance of the check valve, and a nuclear reactor having the same.

Technical Solution

To achieve these and other advantages and in accordance with the purpose of this specification, as embodied and broadly described herein, a prevention device for loss of coolant accident (LOCA) includes: a nozzle portion integrally formed in a reactor vessel and having a communication hole communicating with the inside of the reactor vessel; a nozzle finishing portion assembled to the nozzle portion and an injection line for injecting a fluid to the inside of the reactor vessel respectively on both sides thereof in a communicating manner; and a check valve mounting portion installed to be embedded inside the nozzle portion and having at least one check valve opened by flow such that the fluid is injected into the reactor vessel, wherein the check valve blocks outflow of a reactor coolant from the reactor vessel in case of failure of the injection line. According to this, the first and third objects of the present invention may be achieved.

According to an example related to the present invention, the check valve may have a structure in which the one side is rotated between opening and closing positions of the communication hole due to a pressure difference on the basis of other side.

According to an example related to the present invention, the check valve may include: a support having one side which is hinged and the other side which rotates; and a disk supported by the other side of the support and opening and closing the communication hole.

According to an example related to the present invention, the check valve mounting portion may have a first insertion portion including dual check valves disposed to be spaced apart from each other in a longitudinal direction of the nozzle portion.

According to an example related to the present invention, the first insertion portion may include: a first casing having the dual check valves provided therein; a lid coupled to an upper portion of the first casing to open and close an opening formed in a upper portion of the first casing; and a fastening member fastening the lid.

According to an example related to the present invention, the check valve mounting portion may further include a second insertion portion including an outflow blocking portion opening the communication hole when the first insertion portion is mounted and blocking the communication hole when the first insertion portion is drawn out. According to this, the fourth object of the present invention may be achieved.

According to an example related to the present invention, the second insertion portion may include a second casing disposed inside the nozzle portion to surround the first insertion portion, and the outflow blocking portion may have one side hinged to an one side within the second casing and the other side rotated to open and close the communication hole according to insertion or withdrawal of the first insertion portion.

According to an example related to the present invention, the nozzle portion and the nozzle finishing portion may be increased in thickness to reduce a failure probability. According to this, the second object of the present invention may be achieved.

According to an example related to the present invention, the nozzle portion and the nozzle finishing portion may be fastened to each other by a bolt or welding after the check valve mounting portion is inserted.

According to an example related to the present invention, a sealing portion may be provided in at least one of portions between the nozzle portion and the check valve mounting portion, between the nozzle portion and the nozzle finishing portion, and between the nozzle finishing portion and the injection line.

According to an example related to the present invention, the sealing portion may be an O-ring or a sealing member using thermal expansion force or spring expansion force.

According to an example related to the present invention, the injection line may be a safety injection line to which safety injection water is injected from a safety injection water storage section.

According to an example related to the present invention, the safety injection water storage section may be at least one of a core makeup tank, a safety injection tank, and an in-containment refueling water storage tank (IRWST).

To achieve these and other advantages and in accordance with the purpose of this specification, as embodied and broadly described herein, a nuclear reactor includes: a reactor vessel; a reactor coolant system circulating a reactor coolant stored inside the reactor vessel; a safety injection line through which safety injection water is injected from a safety injection water storage section; and a prevention device for loss of coolant accident (LOCA) blocking outflow of the reactor coolant from the reactor coolant system in case of failure of the safety injection line.

The prevention device for LOCA may include: a nozzle portion integrally formed in a reactor vessel and having a communication hole communicating with the inside of the reactor vessel; a nozzle finishing portion assembled to the nozzle portion and the safety injection line on both sides thereof in a communicating manner; and a check valve mounting portion installed to be embedded inside the nozzle portion and having at least one check valve opened by flow such that the safety injection water is injected into the reactor coolant system.

Advantageous Effects

The effect of the prevention device for LOCA and the nuclear reactor having the same according to the present invention will be described as follows.

First, since dual check valves are embedded (inserted and subsequently assembled) in the reinforced nozzle of the reactor vessel and the injection line for injecting the reactor coolant into the reactor vessel is subsequently connected, if the injection line is broken, an outflow of the reactor coolant (cooling water) from the reactor coolant system is prevented, a pipe in which LOCA occurs may be reduced and safety of the nuclear power plant may be enhanced.

Second, since the dual check valves are protected by the nozzle portion and the nozzle finishing portion of the reactor vessel having a reinforced thickness, damage probability may be remarkably reduced, and although the dual check valves are broken down, a pressure boundary between the reactor coolant system and the injection line may be maintained by the nozzle portion in which the dual check valves are embedded, the nozzle finishing portion, and the isolation valve of the injection line.

Third, in the case of applying the nozzle embedded type check value, although a position of the injection line is lowered, an outflow of the reactor coolant is blocked when the injection line is damaged, thereby resolving restriction regarding a height of connection of the injection line.

Fourth, since the first insertion portion with the dual check valves and the second insertion portion including the outflow blocking portion are applied together, although the first insertion portion is separated, an outflow of the reactor coolant is prevented by the outflow blocking portion without having to adjust a water level of the reactor vessel at the time of a maintenance operation, facilitating maintenance regarding the check valves.

DESCRIPTION OF DRAWINGS

The accompanying drawings, which are included to provide a further understanding of the invention and are incorporated in and constitute a portion of this specification, illustrate exemplary embodiments and together with the description serve to explain the principles of the invention.

In the drawings.

BEST MODE

Hereinafter, a prevention device for loss of coolant accident (LOCA) and a nuclear reactor having the same according to the present invention will be described in detail with reference to the drawings. The singular forms "a", "an" and "the" are intended to include the plural forms as well, unless the context clearly indicates otherwise.

In describing the present invention, if a detailed description of known functions or components associated with the present invention unnecessarily obscures the gist of the present invention, the detailed description will be omitted.

Figure 1:
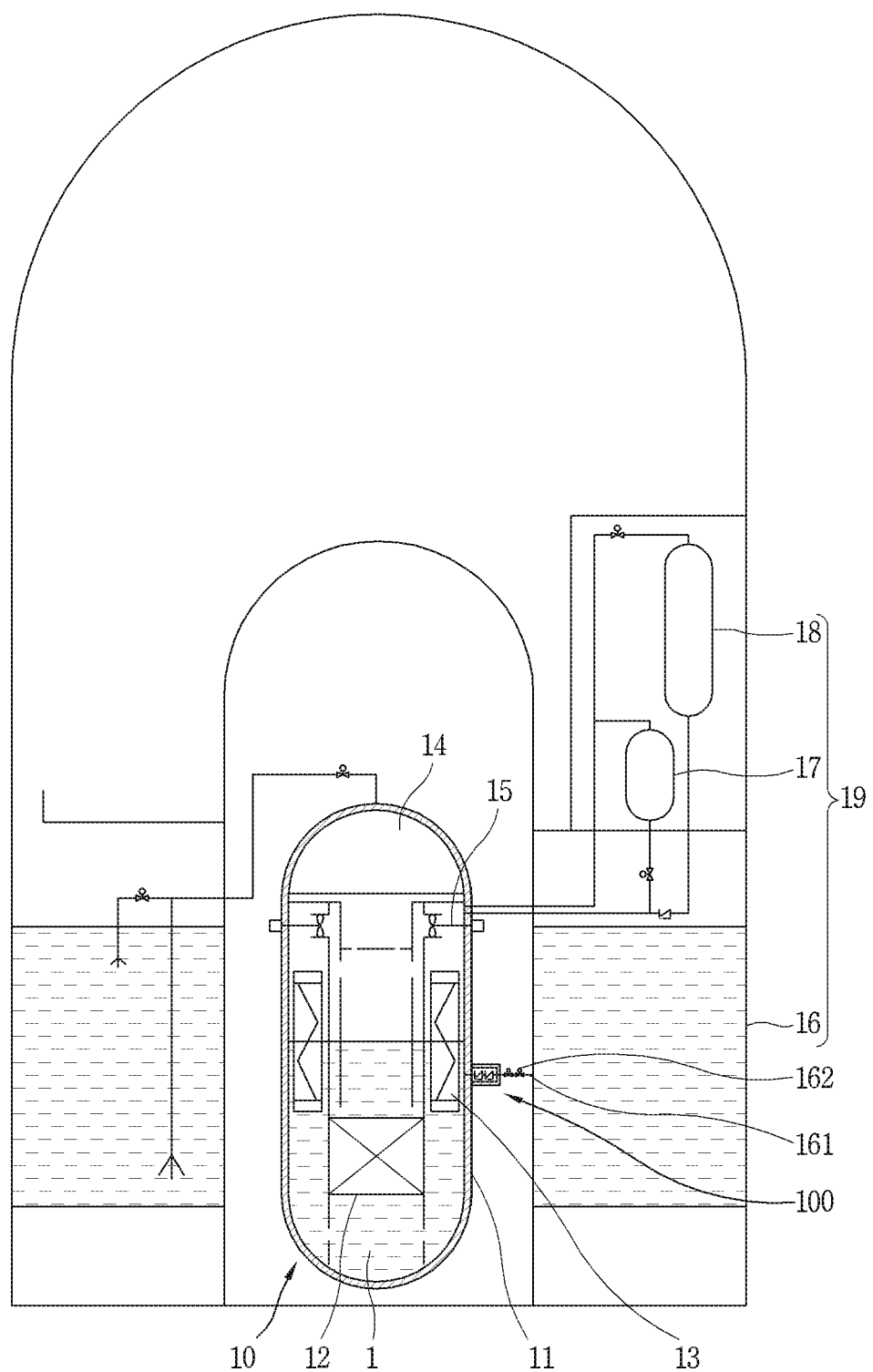
FIG. 1 is a conceptual view illustrating a nuclear power plant in which a prevention device for loss of coolant accident (LOCA) according to the present invention is applied to an injection line of an in-containment refueling water storage tank (IRWST).
Figure 2:
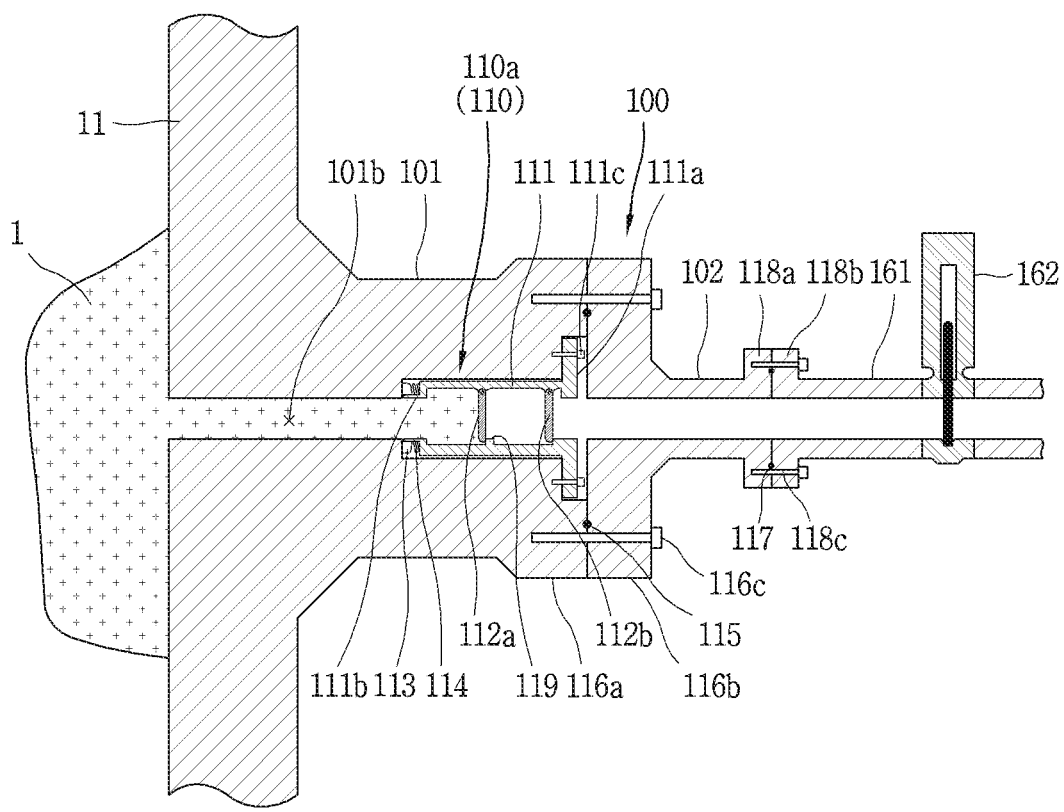
FIG. 2 is a conceptual view illustrating an example of a prevention device for LOCA according to the present invention.

FIG. 1 is a conceptual view illustrating a nuclear power plant in which a prevention device 100 for LOCA according to the present invention is applied to an injection line for injecting cooling water from an in-containment refueling water storage tank (IRWST; 16) to a reactor coolant system 10 in case of an accident and FIG. 2 is a conceptual view illustrating an example of the prevention device 100 for LOCA according to the present invention.

Referring to FIG. 1, a reactor coolant system 10 is provided inside a containment building. The reactor coolant system 10 is a system which circulates a reactor coolant 1. The reactor coolant 1 refers to a cooling fluid, and a core 12 may be cooled by circulating the reactor coolant 1 inside a reactor vessel 11. The reactor coolant system 10 includes a reactor coolant pump 15, a steam generator 13, a pressurizer 14, and the like. The reactor coolant pump 15 is configured to circulate a primary system fluid, i.e., the reactor coolant 1. A steam generator 13 is located in a boundary between primary and secondary systems to induce heat exchange between a primary system fluid and a secondary system fluid. The pressurizer 14 is configured to suppress boiling of the reactor coolant 1 and to control operating pressure.

The nuclear reactor may be a loop type reactor or an integral reactor. The nuclear reactor illustrated in FIG. 1 is an integral reactor in which main devices such as the steam generator 13, the pressurizer 14, and a pump impeller, and the like, are installed inside the reactor vessel 11.

A safety injection system 19 is installed to replenish the reactor coolant 1 in the event of a loss of coolant accident such as pipe breakage. In this embodiment, the safety injection system 19 may include an IRWST 16, a core makeup tank 17, a safety injection tank 18, and the like.

The IRWST 16, the core makeup tank 17 and the safety injection tank 18 may store safety inflow water for replenishing the reactor coolant 1 to serve as a safety injection water source. A safety injection water storage section 193 for storing the safety injection water may be collectively referred to as the IRWST 16, the core makeup tank 17, and the safety injection tank 18. The safety injection water storage section 193 may be configured to be operated by gravity.

For example, each of the core makeup tank 17 and the safety injection tank 18 communicates with an upper portion of the reactor vessel 11 through a pressure balancing line and an injection line, so that when it is balanced in pressure with the reactor vessel 11, that is, the reactor coolant system 10, safety injection water stored in the tank during pressure balance may be safely injected by gravity.

The IRWST 16 is also connected to communicate with the reactor vessel 11 by an injection line 161 extending to a middle height of the reactor vessel 11 higher than the upper portion of the reactor core 12, so that safety injection water stored in the IRWST 16 may be injected safely.

The reactor coolant 1 may be accommodated in the reactor vessel 11.

The injection line 161 provides a flow path through which fluid is injected into the reactor vessel 11.

A plurality of isolation valves 162 may be provided in the injection line 161 to open and close the flow path of the injection line 161.

The prevention device 100 for LOCA may be installed between the reactor vessel 11 and the injection line 161.

The prevent ion device 100 for LOCA may include a nozzle portion 101, a nozzle finishing portion 102, and a check valve mounting portion 110.

The nozzle portion 101 may be integrally formed with a large pipe (not shown, loop type reactor) of the reactor vessel 11 or the reactor coolant system 10 for pipe connection, or the like. The nozzle portion 101 refers to a portion protruding from the reactor vessel 11 or the large pipe of the reactor vessel 11. In this embodiment, a shape of the nozzle portion 101 protruding from the reactor vessel 11 is illustrated.

The injection line 161 of the IRWST 16 may be connected to the nozzle portion 101. The nozzle portion 101 may be formed at a middle height of the reactor vessel 11 so as to communicate with the inside of the reactor vessel 11. The prevention device 100 for LOCA may be connected to the middle height of the reactor vessel 11 through the nozzle portion 101.

Communication holes 101a and 101b (see FIG. 6D) are formed inside the nozzle portion 101 so as to communicate with the inside of the reactor vessel 11. The communication holes 101a and 101b may include a first communication hole 101a (see FIG. 6D) in which the check valve mounting portion 110 is mounted and a second communication hole 101b extending from the first communication hole 101a to the inside of the reactor vessel 11. The second communication hole 101b may be smaller than a diameter of the first communication hole 101a.

The nozzle finishing portion 102 has the communication holes 101a and 101b therein, and one end of the nozzle finishing portion 102 is connected to the nozzle portion 101 in a communicating manner and the other end of the nozzle finishing portion 102 is connected to the injection line 161 in a communicating manner.

The nozzle portion 101 and the nozzle finishing portion 102 may respectively include first coupling portions 116a and 116b disposed to face each other. The first coupling portions 116a and 116b may extend in the outer radial direction and may be provided in a flange shape.

The nozzle portion 101 may be formed to have a diameter and thickness larger than the nozzle finishing portion 102 and the first coupling portions 116a and 116b of the nozzle portion 101 and the nozzle finishing portion 102 may be fastened or welded by a fastening member such as a bolt 116c, or the like. The first coupling portions 116a and 116b illustrated in FIG. 2 are fastened by the bolt 116c.

The nozzle portion 101 and the nozzle finishing portion 102 may be strengthened in thickness so that a failure probability is equal to or smaller than the reactor vessel 11. Particularly, the nozzle portion 101 in which the check valve mounting portion 110 is embedded may be formed to be thicker than the nozzle finishing portion 102. According to this, the nozzle portion 101 and the nozzle finishing portion 102 are not damaged by an impact within the design criterion. That is, it may only be damaged by an impact above the design criterion, and this is a very safe design with which the probability of actual failure occurrence is very low.

The check valve mounting portion 110 may be embedded in the inside of the nozzle portion 101. As described above, since the nozzle portion 101 has the strengthened thickness, a failure probability thereof is significantly reduced, compared with the pipe, and thus, when the check valves 112a and 112b are embedded and installed in the nozzle portion 101, the check valves 112a and 112b may be surrounded by the nozzle portion 101 so as to be protected from an external impact.

The check valve mounting portion 110 has a first insertion portion 110a inserted into the nozzle portion 101.

The first insertion portion 110a may include a casing 111, a plurality of check valves 112a and 112b, and a sealing portion.

The casing 111 has a hollow hole in the form of a pipe. The casing 111 is inserted into the first communication hole 101a of the nozzle portion 101 and installed inside the nozzle portion 101. The casing 111 may be configured such that an outer peripheral surface thereof is in contact with the nozzle portion 101 and both sides of the casing 111 are opened so that the hollow hole communicates with the inside of the reactor vessel 11 through the second communication hole 101b.

The second coupling portion 111a protrudes in an outer radial direction in a flange shape from a rear end of the casing 111 and a coupling groove is formed at a rear end of the nozzle portion 101 so as to face the second coupling portion 111a, so that the casing 111 and the nozzle portion 101 may be fastened by a fastening member such as a bolt 111c, or the like.

An inner end of the second coupling portion 111a protrudes more than the hollow hole so that the inner diameter of the second coupling portion 111a is similar to the nozzle finishing portion 102, whereby flow resistance at the time of injecting a fluid may be minimized. However, when slightly large flow path resistance is allowed according to the design conditions, such a condition may not be applied.

The check valves 112a and 112b may be rotatably installed inside the casing 111. Here, rotation refers to swinging around a hinge. One side of the check valves 112a and 112b may be hinged to an upper portion of the casing 111 and the other side of the check valves 112a and 112b may be rotated up and down about the hinge. The check valves 112a and 112b may be rotated by a pressure difference between the injection line 161 and the reactor vessel 11 to open and close the hollow hole and the second communication hole 101b of the casing 111. That is, the check valves 112a and 112b may be rotated upwardly by flow (injection) of a fluid (e.g., safety injection water) from a closed position arranged to cross the hollow hole of the casing 111 in a vertical direction and, when failure of the injection line 161 occurs and flow of the fluid is changed reversely, the check valves 112a and 112b may be rotated to the original position (closed position). Here, a valve sheet 119 is installed inside the casing 111 so that the check valves 112a and 112b are caught when rotating to the closed position. According to the valve sheet 119, the check valves 112a and 112b are stopped at the closed position of the flow path and an outflow of the reactor coolant 1 may be blocked by the check valves 112a and 112b.

The plurality of check valves 112a and 112b may be disposed in series in the casing 111 such that the check valves 112a and 112b are spaced apart from each other in a longitudinal direction. Two dual check valves 112a and 112b may be spaced apart from each other in the casing 111.

As a result, although failure occurs in any one of the plurality of check valves 112a and 112b, the outflow of the reactor coolant 1 is blocked by another check valve, thereby further enhancing the safety.

The sealing portion mounting portion 111b may be formed at the front end portion of the casing 111. The sealing portion mounting portion 111b may be formed integrally with the casing 111 and have a bent structure with a diameter smaller than the casing 111 so that the sealing portion may be mounted between the nozzle portion 101 and the sealing portion mounting portion 111b. The sealing portion may include an O-ring 115 and/or an elastic sealing member 113. The sealing portion may be elastically supported by a spring 114 that extends to expand in a longitudinal direction of the casing 111. One side of the spring 114 is fixed to the sealing member 113 and the other side of the spring 114 is fixed to the casing 111 so that as the sealing member 113 is elastically pressed toward the nozzle portion 101 by elasticity of the spring 114, airtightness between the casing 111 and the nozzle portion 101 may be maintained by the sealing member 113. Further, the sealing portion may be a material expandable by heat. As a result, as the sealing portion is expanded upon receiving heat from the reactor coolant 1, it may be closely contacted between the casing 111 and the nozzle portion 101 to maintain airtightness.

The sealing portion mounting portion 111b has a flow path area and inner diameter smaller than the casing 111 and similar to the second communication hole 101b of the nozzle portion 101. When the check valves 112a and 112b are opened, an opening surface of the check valves 112a and 112b are positioned to be aligned with the second communication hole 101b, whereby flow resistance may be minimized when the fluid is injected into the reactor vessel 11.

A sealing portion such as the O-ring 115 may be disposed between the first coupling portions 116a and 116b of the nozzle portion 101 and the nozzle finishing portion 102 so as to maintain airtightness between the nozzle portion 101 and the nozzle finishing portion 102.

The injection line 161 may be fastened to a rear end of the nozzle finishing portion 102. Third coupling portions 118a and 118b may protrude in an outer radial direction from the rear end of the nozzle finishing portion 102 and the front end of the injection line 161 to be formed in a flange shape. The third coupling portions 118a and 118b may be fastened or welded by a fastening member such as a bolt 118c, or the like. The third coupling portions 118a and 118b illustrated in FIG. 2 are assembled by the bolt 118c.

A sealing portion such as an O-ring 117 may be installed between the third coupling portions 118a and 118b to maintain airtightness between the nozzle finishing portion 102 and the injection line 161.

Figure 3:
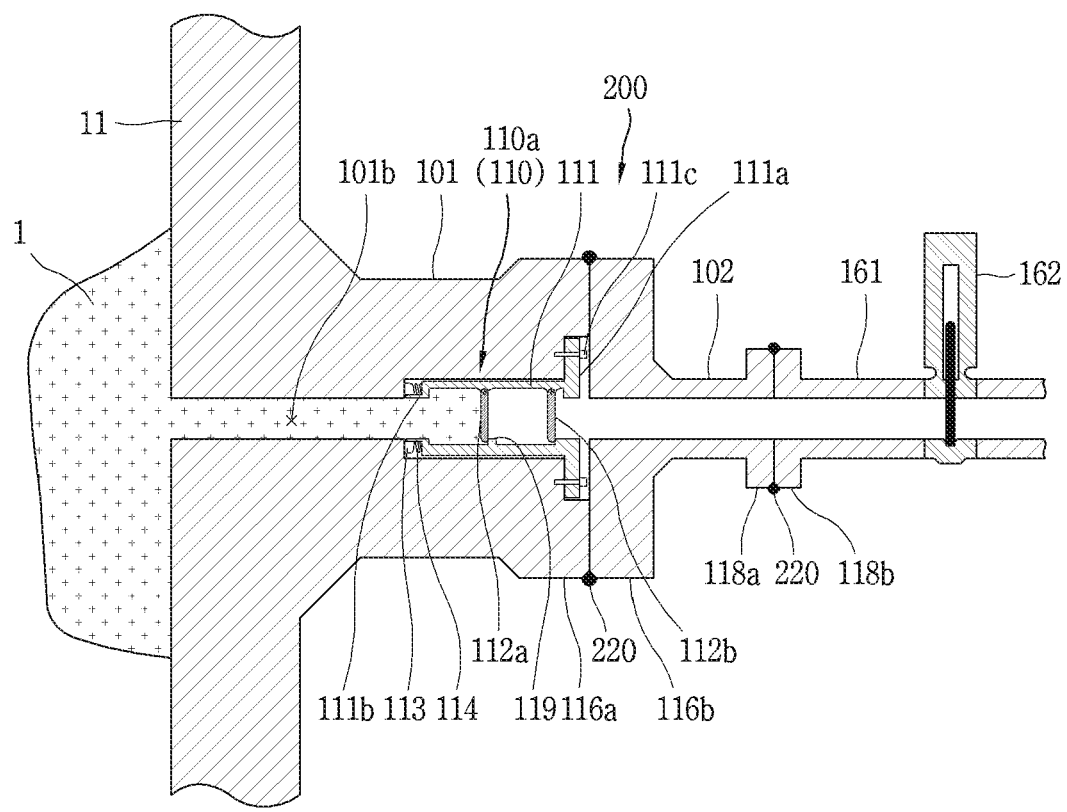
FIG. 3 is a conceptual view illustrating another example of a prevention device for LOCA according to the present invention.

FIG. 3 is a conceptual view illustrating another example of a prevention device 200 for LOCA according to the present invention.

The prevention device 200 for LOCA illustrated in FIG. 3 is different from the embodiment of FIG. 2 in that coupling portions 116a, 116b, 118a, and 118b are coupled by weld 220.

More specifically, the first coupling portions of the nozzle portion 101 and the nozzle finishing portion 102 are welded to each other so as to be joined together. When welding is applied, leakage may be reliably prevented, but there is a drawback in that the welded portion must be removed at the time of maintenance. Other components are the same as or similar to those of the embodiment of FIG. 2, and therefore, duplicate explanations will be omitted.

Figure 4:
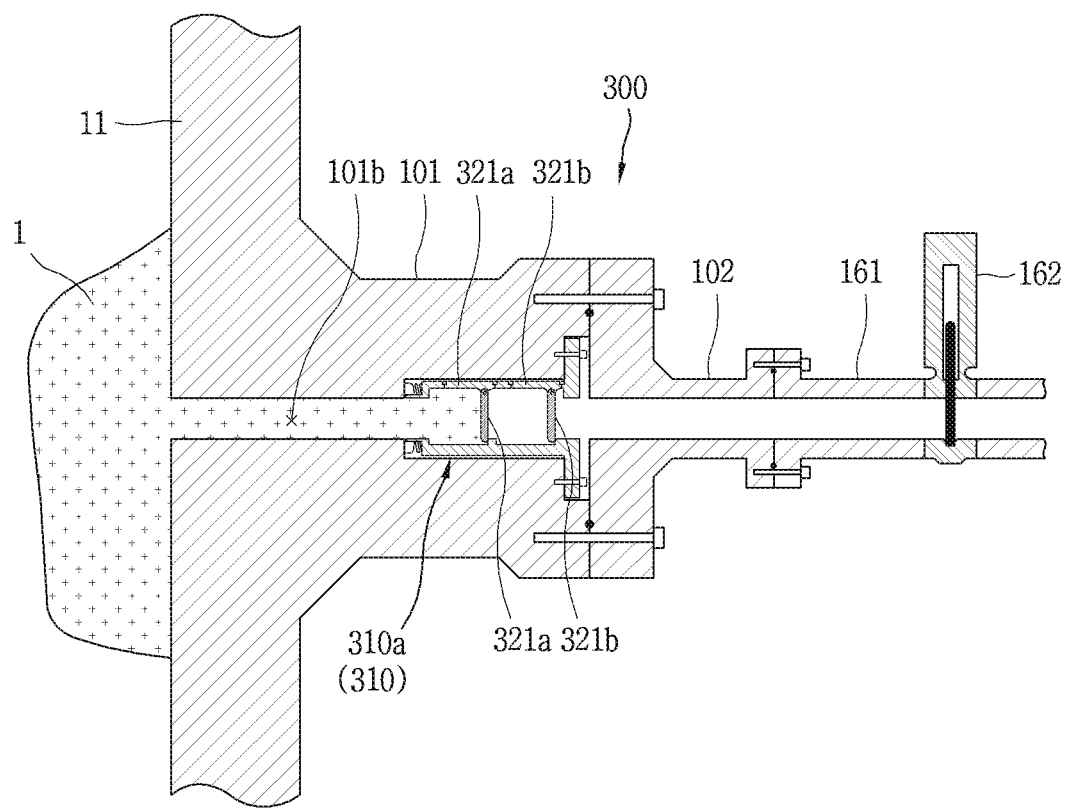
FIG. 4 is a conceptual view illustrating another example of a prevention device for LOCA according to the present invention.
Figure 5:
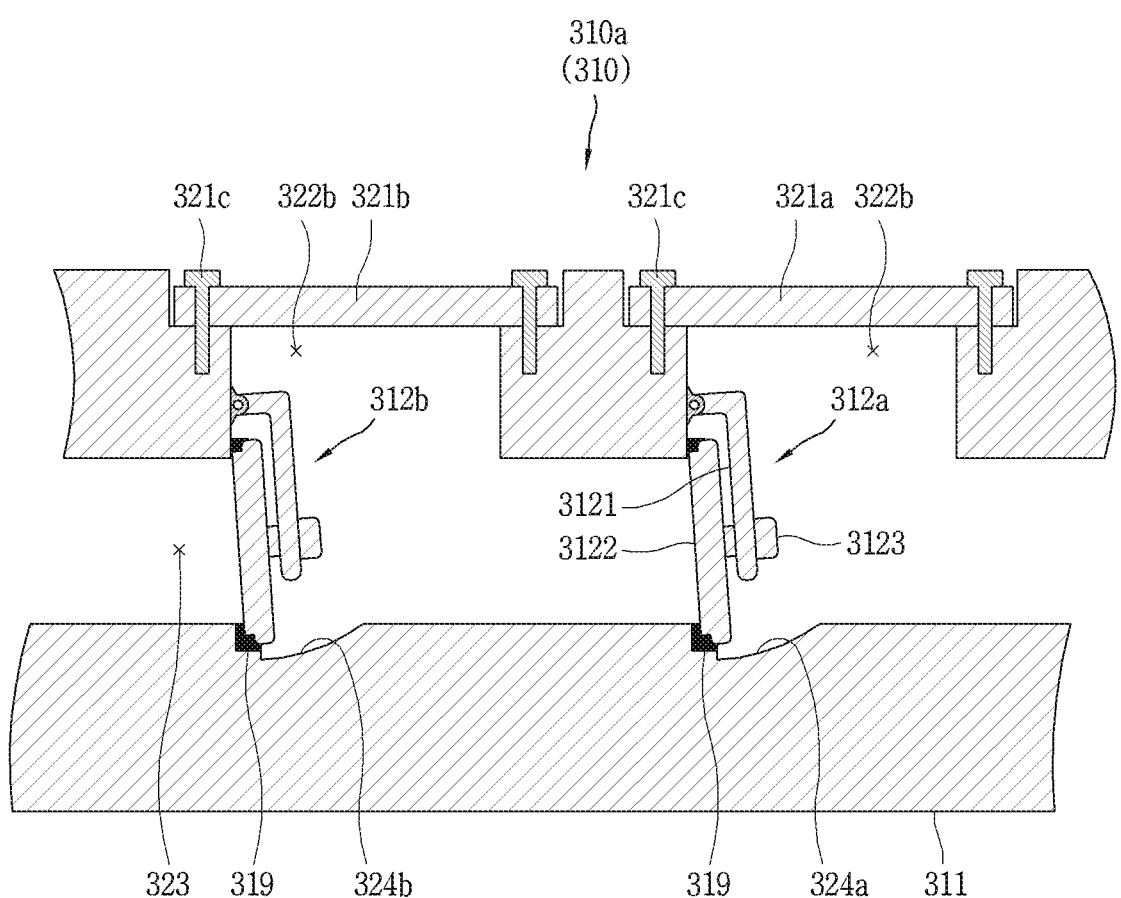
FIG. 5 is a conceptual view illustrating a specific embodiment of the lid portion and the check valve of FIG. 4.

FIG. 4 is a conceptual view illustrating another example of the prevention device 300 for LOCA according to the present invention, and FIG. 5 is a conceptual view illustrating a specific embodiment of a lid portion and a check valve in FIG. 4.

The prevention device 300 for LOCA illustrated in FIG. 4 is different from the embodiment of FIG. 2 in that the casing 111 further includes lid portions 321a and 321b.

More specifically, the lid portions 321a and 321b may be provided on an upper side of the casing 111. The lid portions 321a and 321b may be detachably attached to the casing 311 so that the check valves 312a and 312b may be drawn out to the outside of the casing 111. The lid portions 321a and 321b may include first and second lid portions 321a and 321b spaced from each other in a longitudinal direction on an upper side of the casing 311.

Referring to FIG. 5, two openings 322a and 322b are formed in an upper portion of the casing 111, and the two openings 322a and 322b may be spaced apart in series along a longitudinal direction of the casing 111. The first and second lid portions 321a and 321b may be disposed so as to cover the two openings 322a and 322b, respectively. Fastening holes are formed on both sides of the lid portions 321a and 321b so that the lid portions 321a and 321b may be detachably attached to the casing 111 by fastening members such as the bolt 321c, or the like.

The first opening 322a and the second opening 322b may be formed on an upper side of the casing 311 and spaced apart from each other so as to communicate with the outside of the casing 311. The first opening 322a may be used as a passage for maintenance of the first check valve 312a positioned adjacent to the inside of the reactor vessel 11 among the dual check valves 312a and 312b. The second opening 322b may be used as a passage for maintenance of the second check valve 312b positioned adjacent to the injection line 161.

The first and second lid portions 321a and 321b are mounted on the casing 311 so as to cover the first and second openings 322a and 322b, respectively, and may be separated when the first and second check valves 312a and 312b are drawn out. The first and second lid portions 321a and 321b may be coupled or welded by a fastening member such as the bolt 321c, or the like.

The dual check valves 312a and 312b may include a first check valve 312a and a second check valve 312b. The first check valve 312a may be exposed to the outside of the casing 311 through the first opening 322a and the second check valve 312b may be exposed to the outside of the casing 311 through the second opening 322b.

Accordingly, it is easy to disassemble the check valves 312a and 312b through the openings 322a and 322b at the time of a maintenance work.

The check valves 312a and 312b may include a support 3121, a disc 3122, and a valve sheet 319.

The support 3121 may be formed in a "L" shape such that one side is hinged to one side of the openings 322a and 322b and the other side is rotatable.

The disk 3122 may be formed to have a size enough to cover the hollow hole of the casing 111. A coupling protrusion 3123 may be formed at the center of the disc 3122, and the disc 3122 may be coupled to the other side of the support 3121 by the coupling protrusion 3123 so as to be opened toward the openings 322a and 322b or closed toward the valve sheet 319.

The valve sheet 319 may be extended and fixed around the hollow hole 323 of the casing 111 so that the rim of the disc 3122 may be caught. When the disk is rotated to the closed position, the disk may be caught and stopped by the valve sheet 319.

Two recesses 324a and 324b are formed in a lower portion of the casing 111 at positions corresponding to the openings 322a and 322b to prevent the disc 3122 from being interfered by the casing 111 during rotation.

The check valves 312a and 312b may be opened toward the reactor vessel 11 by a pressure difference to enable safety injection of safety injection water and, when a reverse flow occurs, the check valves 312a and 312b are shut off to prevent leakage of the reactor coolant 1. Other components are the same as or similar to the embodiment of FIG. 2, and therefore duplicate descriptions are omitted.

Figure 6A:
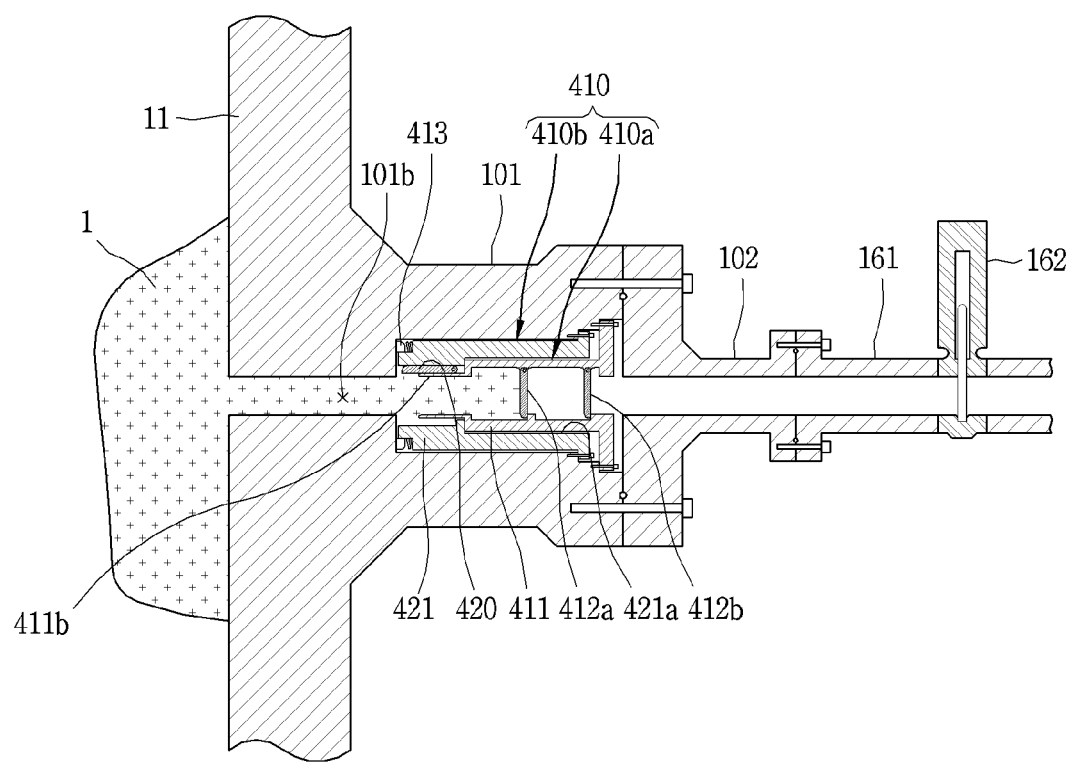
FIG. 6A is a conceptual view illustrating another example of a prevention device for LOCA according to the present invention.
Figure 6B:
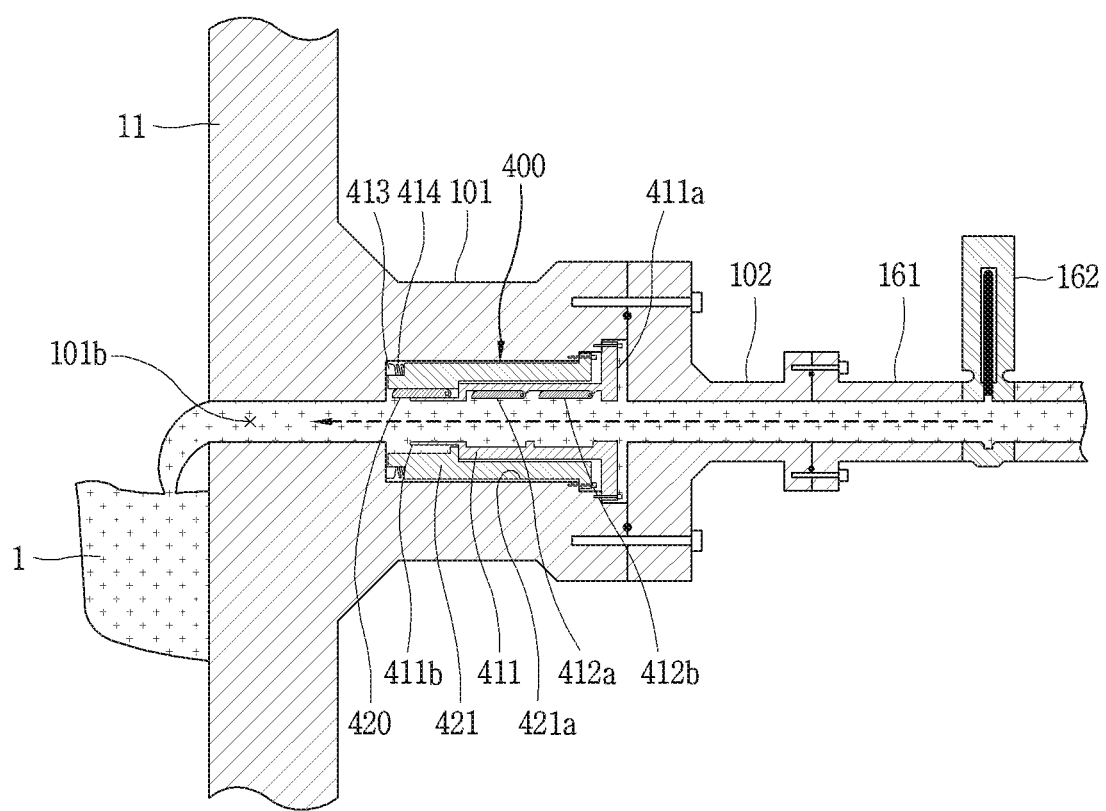
FIG. 6B is a conceptual view illustrating a flow direction at the time of safety injection in FIG. 6A.
Figure 6C:
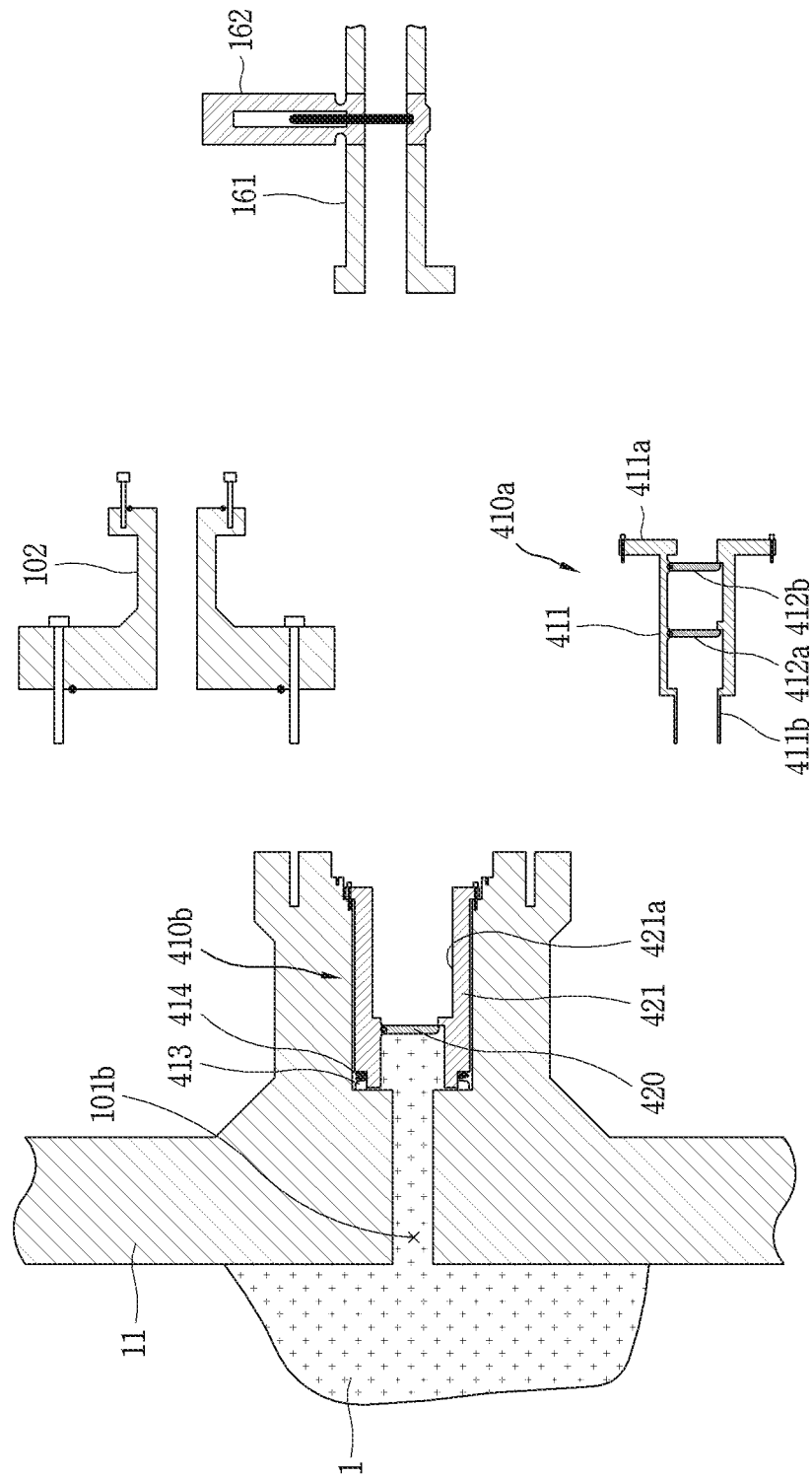
FIG. 6C is a conceptual view illustrating a state in which a first insertion portion of a check valve mounting portion is disassembled even at the time of a high level in FIG. 6A.
Figure 6D:
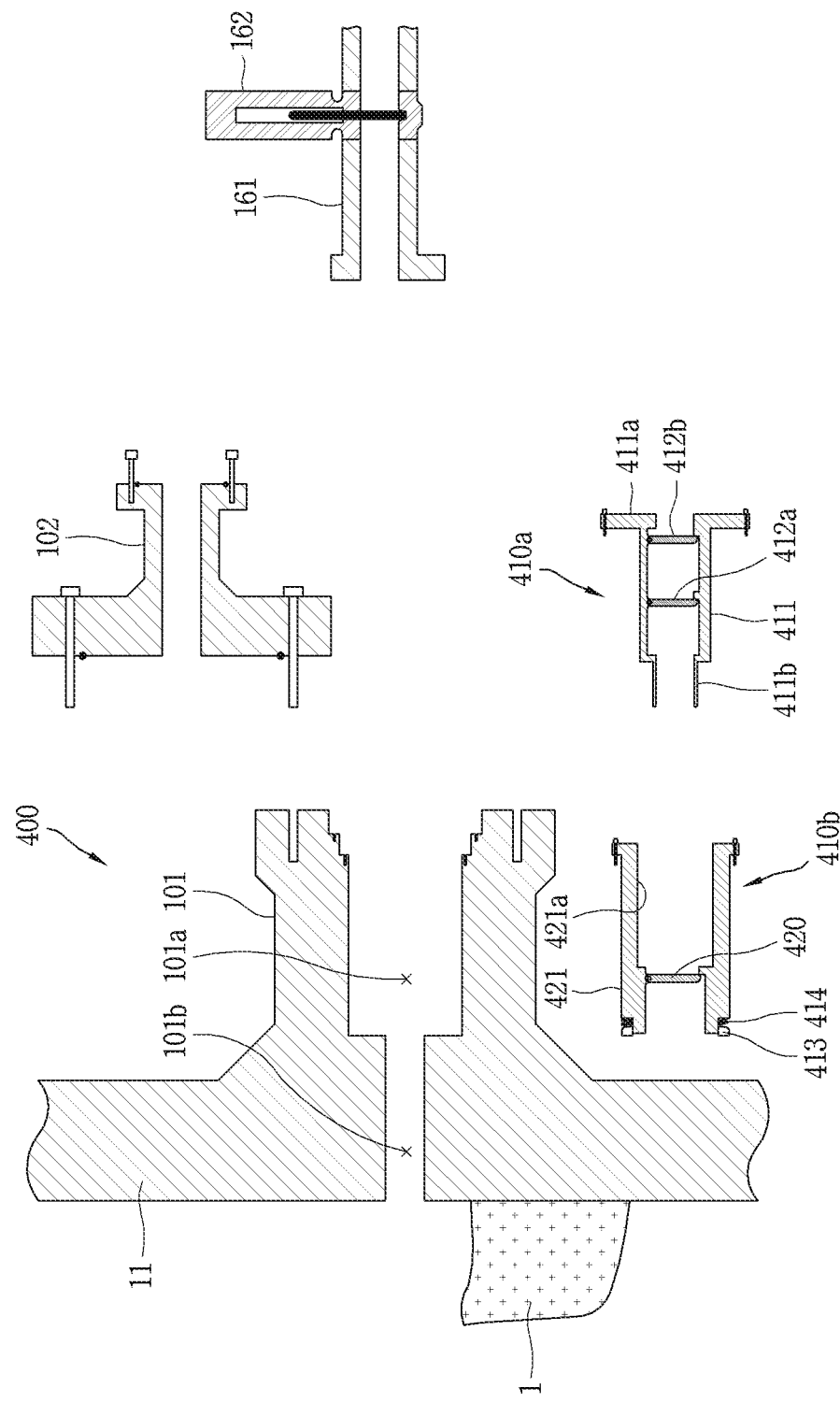
FIG. 6D is a conceptual view illustrating a state in which first and second insertion portions (including the outflow blocking part) of the check valve mounting portion at low water level are disassembled at the time of a low level in FIG. 6A.

FIG. 6A is a conceptual view illustrating another example of a prevention device 400 for LOCA according to the present invention, FIG. 6B is a conceptual view illustrating a flow direction at the time of safety injection in FIG. 6A, FIG. 6C is a conceptual view illustrating a state in which the first insertion portion 410a of the check valve mounting portion 410 is disassembled even at high water level, and FIG. 6D is a view illustrating a state in which the first and second inserting portions 410a and 410b (including the outflow blocking portion 420) of the check valve mounting portion 410 are disassembled when a water level is low in FIG. 6A.

The prevention device 400 for LOCA illustrated in FIG. 6 is different from the embodiment of FIG. 2 in that a second insertion portion 410b in which the outflow blocking portion 420 is embedded is further provided. Hereinafter, differences of the present invention from the embodiment of FIG. 2 will be mainly described. However, in this embodiment, the casing 111 of the first insertion portion 110a described in FIG. 2 may be referred to as a first casing 411 in order to distinguish it from the second casing 421 described later.

The second insertion portion 410b may be disposed outside of the first insertion portion 410a.

The second insertion portion 410b may include a second casing 421 and an outflow blocking portion 420.

The second casing 421 may be formed in the shape of a pipe having a hollow hole formed therein. The second casing 421 is configured to enclose at least a portion of the first casing 411.

The outflow blocking portion 420 is rotatably installed inside the second casing 421. One side of the outflow blocking portion 420 may be hinged to the second casing 421 and the other side of the outflow blocking portion 420 may be rotated to a position where the hollow hole of the second casing 421 is closed. FIG. 6 shows a structure in which the upper side of the outflow blocking portion 420 is hinged to the second casing 421 and the other side is rotatable in the vertical direction.

In particular, a rotation direction of the outflow blocking portion 420 may be determined according to whether the first insertion portion 410a is mounted or not. That is, when the first insertion portion 410a is inserted, the outflow blocking portion 420 may be opened by the first insertion portion 410a, and when the first insertion portion 410a is drawn out, the outflow blocking portion 420 may be closed by pressure of a fluid.

To this end, the outflow blocking portion 420 may have a structure in which one side thereof is hinged to an inner surface of the second casing 421 and the other side is pressed by a front end of the first casing 411 and rotated.

The first housing 411 may include a pressing portion 411b instead of the sealing portion mounting portion 111b described in the embodiment of FIG. 2. The pressing portion 411b may be similar in structure to the sealing portion mounting portion 111b but is different in function. That is, when the first insertion portion 410a is inserted into the hollow hole of the second casing 421, the pressing portion 411b may push up the other side of the outflow blocking portion 420 to open the outflow blocking portion 420. Here, the outflow blocking portion 420 is disposed between the first casing 411 and the second casing 421 so that the outflow blocking portion 420 may maintain an opened state, while being in contact with the first and second casings 411 and 421. In this manner, since the outflow blocking portion 420 is always open under the normal operation condition of the nuclear power plant, it does not affect a safety function at all.

A receiving recess 421a is formed so that the first casing 411 is inserted into the inner circumferential surface of the second casing 421 and a length of the receiving recess 421a may limit an insertion distance of the first casing 411. That is, as a portion of the first housing 411 slides along the receiving recess 421a and caught by the end of the receiving recess 421a, mounting of the first insertion portion 110a may be completed.

An inner diameter of the second casing 421 is formed to be larger than an outer diameter of the pressing portion 411b of the first casing 411, and thus, the inner diameter of the second casing 421 may be greater than the outer diameter of the pressing portion 411b by a thickness of the outflow blocking portion 420.

The pressing portion 411b may have an inner diameter equal to the diameter of the second communication hole 101b, minimizing flow resistance.

The sealing member 413 is disposed between the front end portion of the second casing 421 and the nozzle portion 101 to maintain airtightness between the second casing 421 and the nozzle portion 101.

Here, the outflow blocking portion 420 operates when the first insertion portion 410a is drawn out to repair the check valves 412a and 412b for a maintenance work (performing the outflow blocking function), and does not operate in a state in which the first insertion portion 410a is installed.

Referring to FIG. 6A, the nozzle-embedded type check valves 412a and 412b are devices that operate by a pressure difference between the inside and the outside of the reactor vessel 11 and are arranged at a boundary between the reactor coolant system 10 and the injection line 161. During a normal operation of the nuclear power plant, the check valve mounting portion 410 is assembled and operated, and when the isolation valve 162 is installed, the isolation valve 162 is operated in a closed state. According to this, the check valves 412a and 412b are closed during the normal operation to maintain a pressure boundary of the reactor coolant system 10.

Referring to FIG. 6B, when a breakage of an outflow side pipe other than the inject ion line 161 occurs, the isolation valve 162 is opened by a related signal and safety injection water may be introduced through the injection line 161. As a water level of the reactor vessel 11 is lowered than the nozzle portion 101 and internal pressure is lower than the injection line 161, flow of safety injection water may be formed due to a pressure difference before and after the check valves 412a and 412b. Both the dual check valves 412a and 412b are opened by the flow of the safety injection water so that safety injection water may be injected from the injection line 161 to the inside of the reactor vessel 11.

Referring to FIG. 6C, a maintenance work may be carried out on the check valves 412a and 412b when the nuclear power plant is stopped for maintenance of the nuclear power plant for refueling fuel, or the like. Even when the second insertion portion 410b is installed, the first insertion portion 410a and the second insertion portion 410b may be separated from each other according to a water level of the reactor coolant system 10.

For example, even when the water level of the reactor vessel 11 is a high level, that is, even at a position higher than the nozzle portion 101, only the first insertion portion 410a may be separated to repair or replace the first and second check valves 412a and 412b.

When the first insertion portion 410a is disengaged, pressurization of the pressing portion 411b of the first insertion portion 410a to the outflow blocking portion 420 is released and the outflow blocking portion 420 is rotated to be closed by pressure of a fluid to block outflow (leakage) of the reactor coolant 1.

A disassembling order of the first insertion portion 410a is a reverse order of an installation order of the first insertion portion 410a. That is, the injection line 161 is disassembled from the nozzle finishing portion 102, the nozzle finishing portion 102 is disassembled from the nozzle portion 101, and then the first insertion portion 410a is disassembled from the nozzle portion 101.

Referring to FIG. 6D, when the water level of the reactor vessel 11 is low, that is, when the water level of the reactor vessel 11 is lower than that of the nozzle portion 101, the second insertion portion 410b may also be separated, inspected, repaired, or replaced. The injection line 161, the nozzle finishing portion 102, the first insertion portion 410a, and the second insertion portion 410b are disassembled in this order.

Figure 7A:
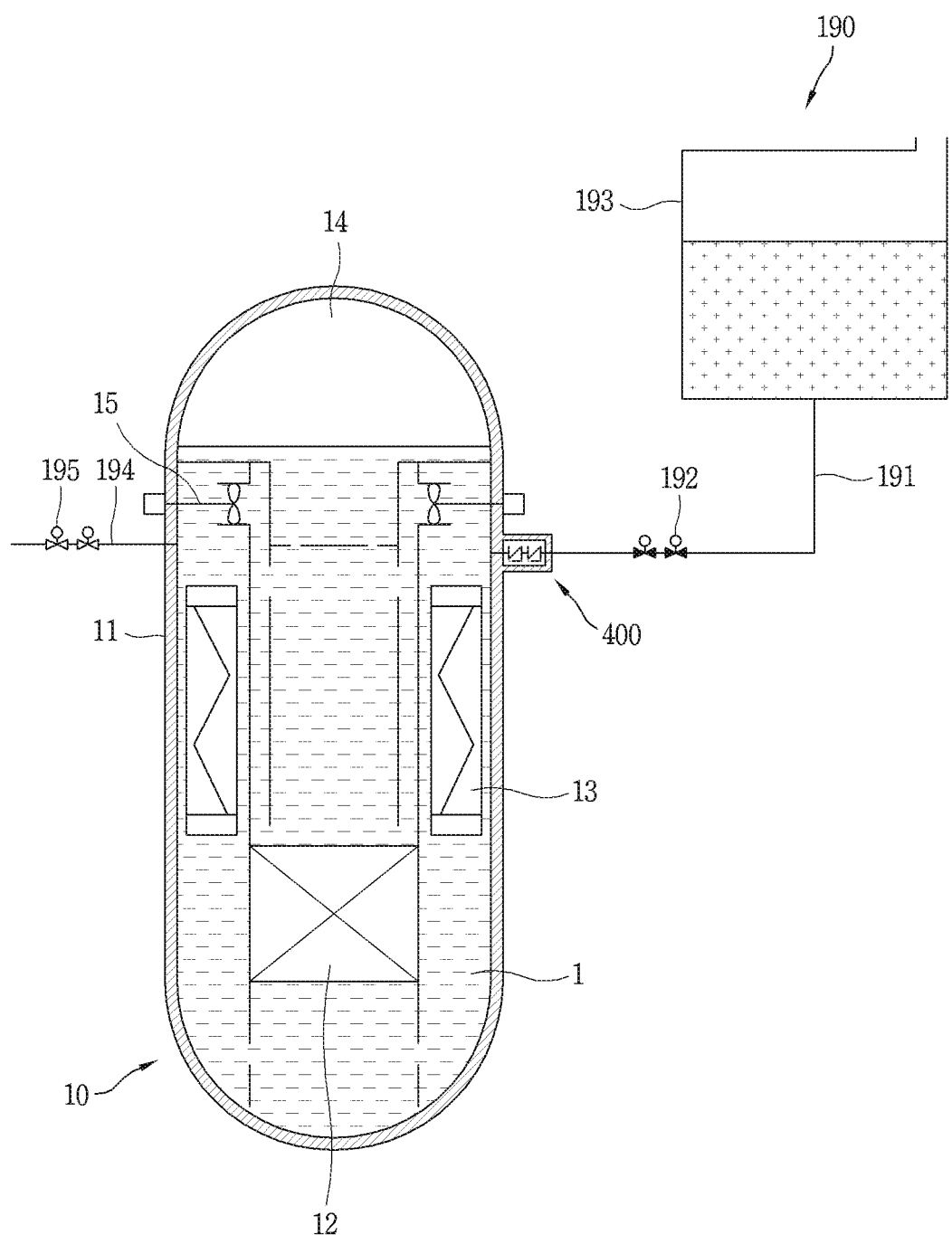
FIG. 7A is a conceptual view illustrating a shape of a nuclear power plant having a prevention device for LOCA according to the present invention during a normal operation of a nuclear power plant.
Figure 7B:
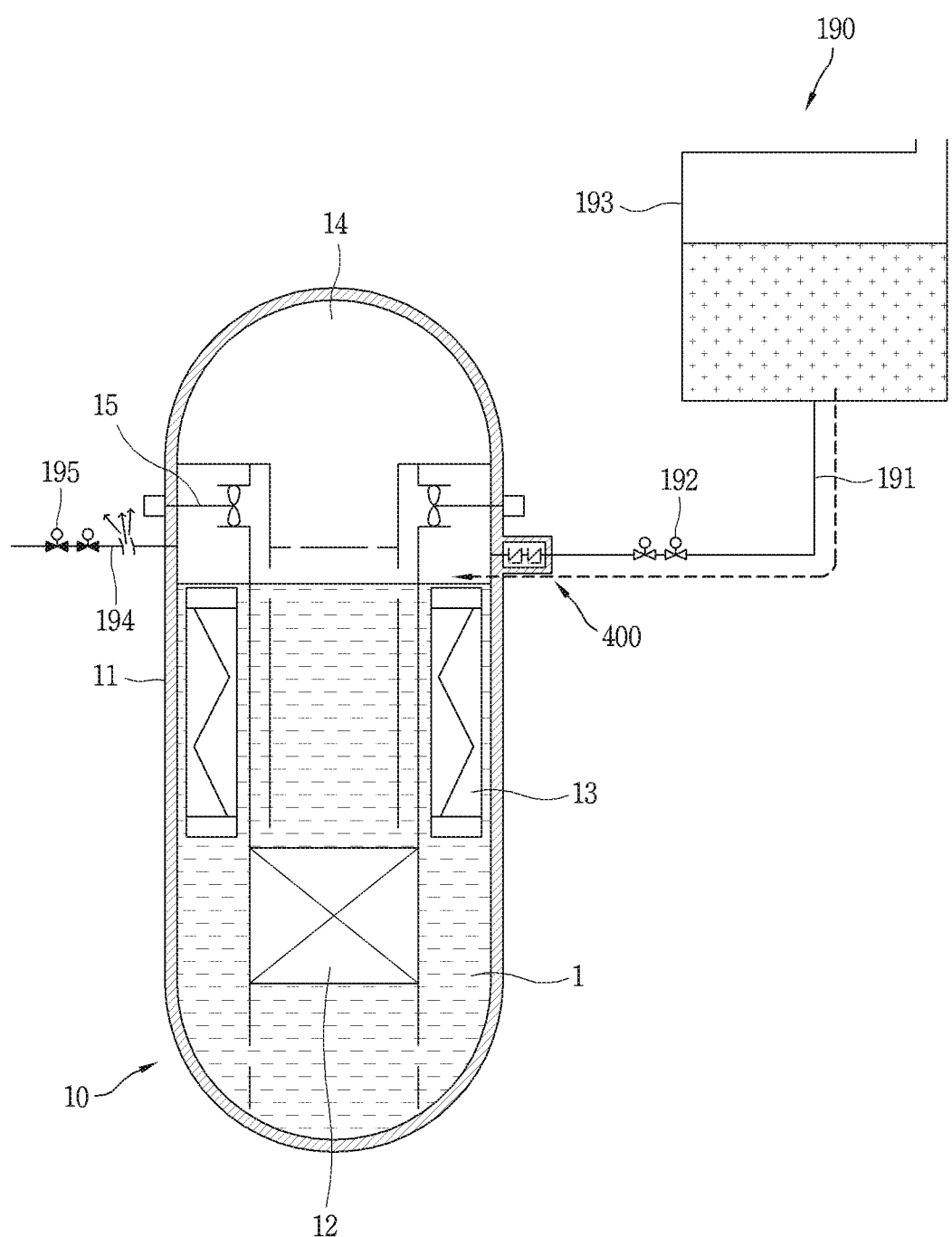
FIG. 7B is a conceptual view illustrating a state in which a safety inject ion water is injected in case of a pipe breakage accident in FIG. 7A.
Figure 7C:
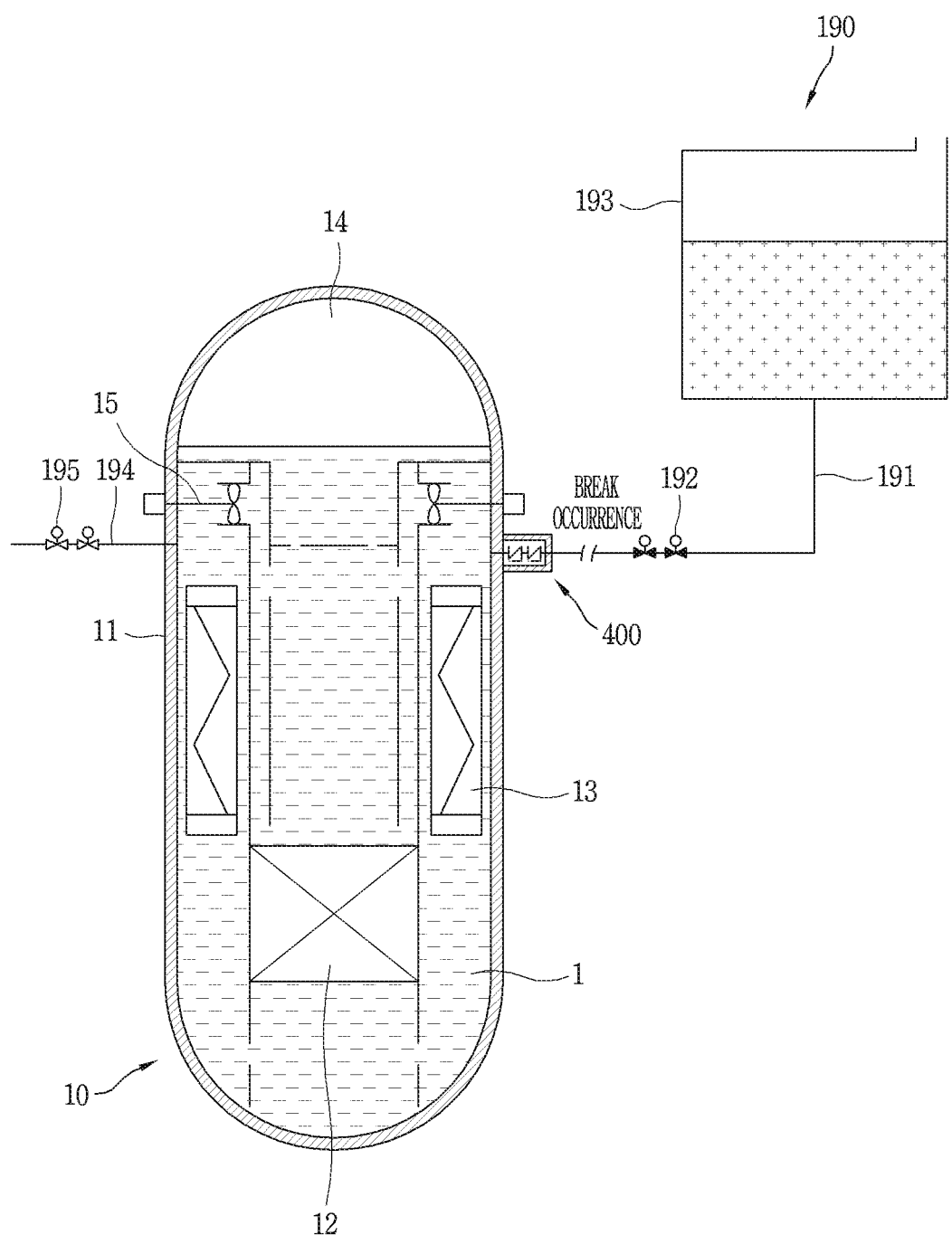
FIG. 7C is a conceptual view illustrating a state in which an outflow of a reactor coolant is blocked in case of a breakage accident of an injection line in FIG. 7A.

FIG. 7A is a conceptual view illustrating a shape of a nuclear power plant having a prevention device 400 for LOCA according to the present invention during a normal operation of a nuclear power plant, FIG. 7B is a conceptual view illustrating a state in which a safety injection water is injected in case of a pipe breakage accident in FIG. 7A, and FIG. 7C is a conceptual view illustrating a state in which an outflow of a reactor coolant is blocked in case of a breakage accident of an injection line 191 in FIG. 7A.

Referring to FIG. 7A, the safety injection water storage section 193 may be connected to an upper portion of a side surface of the reactor vessel 11 by the injection line 191. An isolation valve 192 may be provided in the injection line 191 to open and close a flow path of the injection line 191.

The safety injection water storage section 193 may include at least one of a core makeup tank 17 and a safety injection tank 18. When design characteristics are different like the case where a pressurized safety injection tank is connected to one side of the injection line 191, for example, like the case where an isolation valve is installed in a pipe connecting an upper portion of the reactor vessel 11 and an upper portion of the safety injection tank 18 illustrated in FIG. 1, the isolation valve may not be installed.

The prevent ion device 400 for LOCA may be installed at the boundary between the reactor vessel 11 and the injection line 191. A connection pipe 194 may be communicatively connected to an upper portion of a side surface of the reactor vessel 11 which is opposite to the injection line 191. A plurality of isolation valves 195 may be installed at the connection pipe 194 to open and close a flow path of the connection pipe 194.

According to the configuration, during the normal operation, internal pressure of the reactor vessel 11 is larger than that of the injection line 161 and the dual check valves embedded in the nozzle portion 101 may be closed by the flow pressure of the fluid, preventing leakage of the reactor coolant 1.

Referring to FIG. 7B, when the water level of the reactor vessel 11 is lowered in the event of a breakage accident in the pipe 194 other than the injection line 191, the isolation valve 195 of the other pipe 194 is closed upon receiving a closing signal from a controller and the isolation valve 192 of the injection line 191 is opened upon receiving an opening signal. Accordingly, when pressure inside the reactor vessel 11 is lowered due to the accident, safety injection water is discharged from the safety injection water storage section 193 and descends along the injection line 191 by gravity.

The dual check valves are opened by flow pressure of the safety injection water so that the safety injection water is safely injected into the reactor vessel 11 and the reactor coolant 1 is replenished by the safety injection water to maintain the integrity of the core 12.

Referring to FIG. 7C, in the event of the breakage accident of the injection line 191, the isolation valve 192 of the injection line 191 is in a closed state and pressure of the injection line 191 is rapidly dropped due to the breakage portion.

Since the dual check valves are closed by the pressure difference, outflow of the reactor coolant 1 from the reactor vessel 11 may be blocked.

Thus, according to the present invention, in the nozzle-embedded type check valves 112a, 112b, 312a, 312b, 412a, and 412b, after the check valve mounting portions 110, 310, and 410 including the plurality of check valves 112a and 112b, 312a, 312b, 412a, and 412b are inserted and mounted inside the nozzle portion 101 protruding outwards from the reactor vessel 11, the nozzle finishing portion 102 is assembled and finished.

Here, one side of the nozzle finishing portion 102 is fastened to the nozzle portion 101, and the other side of the nozzle finishing portion 102 is fastened to the injection lines 161 and 191. The nozzle portion 101 and the nozzle finishing portion 102 are thicker than the injection lines 161 and 191 so as to be reinforced.

That is, the nozzle portion 101, the nozzle finishing portion 102, and the check valve mounting portions 110, 310, and 410 are strengthened so as not to be damaged at the same time due to failure, or the like. Since the nozzle portion 101 and the nozzle finishing portion 102 are strengthened, the nozzle portion 101 and the nozzle finishing portion 102 are significantly reduced in a failure probability, so as to be strengthened similar to the reactor vessel 11.

Even though all the check valve mounting portions 110, 310, and 410 are damaged, the nozzle portion 101, the nozzle finishing portion 102, and the injection lines 161 and 191 are not damaged at the same time, and the nozzle portion 101, the nozzle finishing portion 102, the injection lines 161 and 191, and the isolation valve maintain a pressure boundary of the reactor coolant system 10 to block outflow of the reactor coolant 1 (cooling water) (preventing a loss of coolant accident in the injection line 161).

In the case of a configuration without installing the isolation valve, for example, in the case of the pressurized safety injection tank, if design pressure of the safety injection line 191, the safety injection tank 193, outside the nozzle portion 101 and the nozzle finishing portion 102, and the like, is strengthened, a loss of coolant accident does not occur although the check valve mounting portions 110, 310, and 410 are damaged.

Also, in case where the injection lines 161 and 191 outside the nozzle portion 101 and the nozzle finishing portion 102 are broken, the dual check valves 112a, 112b, 312a, 312b, 412a, and 412b may operate to block outflow of the reactor coolant 1.

When safety injection is required, the check valves 112a, 112b, 312a, 312b, 412a, and 412b may be opened by flow pressure after the isolation valves 162 and 192 of the injection lines 161 and 191 are opened.

In the case of configuration without installing the isolation valve, for example, in the case of the pressurized safety injection tank, the nozzle-embedded type check valves 112a, 112b, 312a, 312b, 412a, and 412b may operate by a passive principle based on a pressure difference that appears in the event of an accident without a help such as a separate operating signal, a control system, power for providing driving force provided from the outside to operate the nozzle-embedded type check valves 112a, 112b, 312a, 312b, 412a, 412b.

The nozzle-embedded type check valves 112a, 112b, 312a, 312b, 412a, and 412b may be partially applied only to a pipe installed for special purposes, such as installation of the safety injection line 191 at the lower end of the reactor vessel 11, to prevent a loss of coolant accident.

The nozzle-embedded type check valves 112a, 112b, 312a, 312b, 412a, and 412b have a simple circulation structure, obtaining high reliability.

Although a few exemplary embodiments have been shown and described, it will be appreciated by those skilled in the art that changes may be made in these exemplary embodiments without departing from the principles and spirit of the invention, the range of which is defined in the appended claims and their equivalents.

Also, the exemplary embodiments of the present invention are provided to explain the technical spirit of the present invention but not to limit such spirit. The scope of the technical spirit of the present invention is not limited by the exemplary embodiments of the present invention.

The invention claimed is:

1. A prevention device for loss of coolant accident (LOCA), the prevention device comprising:
a nozzle portion integrally formed in a reactor vessel and having a communication hole communicating with the inside of the reactor vessel;
a nozzle finishing portion assembled to the nozzle portion and an injection line for injecting a fluid to the inside of the reactor vessel respectively on both sides of the nozzle finishing portion in a communicating manner; and
a check valve mounting portion installed to be embedded inside the nozzle portion and having at least one check valve opened by flow such that the fluid is injected into the reactor vessel,
wherein the check valve blocks outflow of a reactor coolant from the reactor vessel in case of failure of the injection line,
wherein the check valve mounting portion has a first insertion portion including dual check valves disposed to be spaced apart from each other in a longitudinal direction of the nozzle portion and a second insertion portion including an outflow blocking portion opening the communication hole when the first insertion portion is mounted and blocking the communication hole when the first insertion portion is drawn out, and
wherein the second insertion portion includes a second casing disposed inside the nozzle portion to surround the first insertion portion, and the outflow blocking portion has one side hinged to an upper side within the second casing and the other side rotated to open and close the communication hole according to insertion or withdrawal of the first insertion portion.

2. The prevention device of claim 1, wherein the check valve is configured to be rotated to open or block the communication hole according to a pressure of the outflow of the reactor coolant.

3. The prevention device of claim 2, wherein the check valve includes:
a support having one side which is hinged and the other side which rotates vertically; and
a disk supported by the other side of the support and opening and closing the communication hole.

4. The prevention device of claim 1, wherein the first insertion portion includes:
a first casing having the dual check valves provided therein;
a lid coupled to an upper portion of the first casing to open and close an opening formed in an upper portion of the first casing; and
a fastening member fastening the lid.

5. The prevention device of claim 1, wherein the nozzle portion is formed to be thicker than the nozzle finishing portion to reduce a failure probability.

6. The prevention device of claim 1, wherein the nozzle portion and the nozzle finishing portion are fastened to each other by a bolt or welding after the check valve mounting portion is inserted.

7. The prevention device of claim 1, wherein a sealing material is provided in between the nozzle portion and the check valve mounting portion, between the nozzle portion and the nozzle finishing portion, or between the nozzle finishing portion and the injection line.

8. The prevention device of claim 7, wherein the sealing material is an O-ring or a sealing member using thermal expansion force or spring expansion force.

9. The prevention device of claim 1, wherein
the injection line is a safety injection line to which safety injection water is injected from a safety injection water storage section.

10. The prevention device of claim 9, wherein
the safety injection water storage section is at least one of a core makeup tank, a safety injection tank, and an in-containment refueling water storage tank (IRWST).

11. A nuclear reactor comprising:
a reactor vessel;
a reactor coolant system circulating a reactor coolant stored inside the reactor vessel;
a safety injection line through which safety injection water is injected from a safety injection water storage section; and
a prevention device for loss of coolant accident (LOCA) blocking outflow of the reactor coolant from the reactor coolant system in case of failure of the safety injection line, wherein the prevention device for LOCA includes: the prevention device of claim 1.

* * * * *